United States Patent
Kitai (10) Patent No.: US 9,829,744 B2
(45) Date of Patent: Nov. 28, 2017

(54) HIGH PERFORMANCE SEAMLESS LIGHT EMITTING DIODE ILLUMINATED DISPLAY

(71) Applicant: MCMASTER UNIVERSITY, Hamilton (CA)

(72) Inventor: Adrian Kitai, Mississauga (CA)

(73) Assignee: McMaster University, Hamilton, ON (CA)

( * ) Notice: Subject to any disclaimer, the term of this patent is extended or adjusted under 35 U.S.C. 154(b) by 0 days.

(21) Appl. No.: 15/301,866

(22) PCT Filed: Apr. 7, 2015

(86) PCT No.: PCT/CA2015/050278
§ 371 (c)(1),
(2) Date: Oct. 4, 2016

(87) PCT Pub. No.: WO2015/149189
PCT Pub. Date: Oct. 8, 2015

(65) Prior Publication Data
US 2017/0031209 A1    Feb. 2, 2017

Related U.S. Application Data

(60) Provisional application No. 61/975,393, filed on Apr. 4, 2014.

(51) Int. Cl.
*G02F 1/1335* (2006.01)

(52) U.S. Cl.
CPC .. *G02F 1/133603* (2013.01); *G02F 1/133606* (2013.01); *G02F 1/133621* (2013.01);
(Continued)

(58) Field of Classification Search
None
See application file for complete search history.

(56) References Cited

U.S. PATENT DOCUMENTS

| 2008/0284677 | A1 | 11/2008 | Whitehead et al. |
| 2010/0277696 | A1 | 11/2010 | Huebner |
| 2012/0236217 | A1* | 9/2012 | Kitai ............. G02F 1/133603 349/5 |

FOREIGN PATENT DOCUMENTS

WO    2011/029188    3/2011

OTHER PUBLICATIONS

International Search Report in PCT/CA2015/050278, dated Jul. 28, 2015.
Written Opinion in PCT/CA2015/050278, dated Jul. 28, 2015.

* cited by examiner

*Primary Examiner* — Richard Kim
(74) *Attorney, Agent, or Firm* — Lynn C. Schumacher; Stephen W. Leonard; Hill & Schumacher (57) ABSTRACT

A display illumination module for the illumination of a rear-projection screen is provided in which a first array of light sources is positioned adjacent to a first face of an optical modulating array layer for modulating the transmission of light emitted by the first array light sources. The first array light sources emit light within a defined angular range, and the optical modulating array layer is positioned relative to the first array of light sources so that light from adjacent light sources does not overlap at the optical modulating array layer. A second array of light sources is positioned adjacent to a second side of the optical modulation array layer and is arranged such that light from the second array of light sources does not pass through said optical modulation array layer and said second array of light sources does not substantially block light from the first array of light sources passing through the optical modulating array layer. One or more display modules may be incorporated into a display system that includes a rear projection screen that is spatially offset from the optical modulating array layer so (Continued)

that light emitted from adjacent light sources in either the first or the second array of light sources overlaps on the screen.

20 Claims, 6 Drawing Sheets

(52) U.S. Cl.
CPC ............ *G02F 2001/133612* (2013.01); *G02F 2001/133626* (2013.01)

HIGH PERFORMANCE SEAMLESS LIGHT EMITTING DIODE ILLUMINATED DISPLAY

FIELD

The present disclosure relates to display systems, and more particularly relates to modular liquid crystal display systems having light emitting diode illumination.

BACKGROUND

Light emitting diode (LED) technology enables high efficiency white, red, green and blue light sources with lifetimes of approximately 100,000 hours. White emitting LEDs are now in widespread use for liquid crystal display (LCD) backlighting and are entering general lighting markets. Red, green and blue LEDs are widely used in large video displays where each LED is directly viewed and electrically controlled. LED displays are bright and can be large however the resolution measured in total pixel count depends on the number of LEDs. For example a full colour high resolution screen having 1080 rows and 1920 columns requires 6,220,800 LEDs. In many applications where high resolution colour displays are used, this approach is costly.

In conventional colour LCDs, the standard approach has been to use a bright white light source as a backlight, and to employ an addressable colour LC (liquid crystal) light modulator that includes a colour filter array to control the colour and brightness of each pixel. This technology has become the leading solution for television displays. LCDs are also used for smaller computer and handheld displays. White LEDs have been adopted as a preferred backlight technology for LC displays of all sizes. This LC technology is limited by the glass size of the LC modulator. Both plasma and liquid crystal displays rely on glass sheets and are not readily available in sizes above approximately 100 inches. Making much larger units is a challenge due to glass processing and transportation issues.

For larger displays such as video walls, the use of tiled LC or plasma displays is popular. Videowall displays are typically a set of flat panel displays placed as closely as possible to each other. The desired image may be spread across the set of displays, however there are gaps between the active areas of these displays that generally detract from the viewing experience. These gaps are formed by the bezels surrounding each display and are often referred to as bezel gaps. Bezel gaps as small as a few millimeters are achievable with premium LC and plasma display videowalls and are often a few centimeters in lower price videowalls.

A significant disadvantage of the aforementioned LED displays as well as LCD-based and plasma based videowalls is the inability to economically produce large size, high resolution displays having no visible bezel gaps. Currently, seamless tiling between display units can be achieved using projection display systems. A technique known as edge blending allows multiple projectors to overlap their images on a single screen. Such systems are not flat panels and are not suitable for certain applications such as wall mounted displays where a thin form factor is required.

An array of projectors comprising LC light modulators backlit by LEDs has been identified as an approach to making displays of arbitrary sizes. US Patent Application US2008/0284677A1 (WHITEHEAD et al) publication date Nov. 20, 2008 teaches the use of an array of discrete modules, each comprising a projector having a processor and a light modulator, projecting on a screen to form an image. Light from a given module may overlap with light from adjacent modules at the screen. The overall display size is dependent on the number of modules.

In U.S. Provisional Application No. 61/240,412 "LIGHT EMITTING DIODE ILLUMINATED DISPLAY" filed on Sep. 8, 2009, the use of multiple LC light modulators, each containing arrays of LEDs is disclosed. Specifically the elimination of bezel-gaps using edge blending has been disclosed. This concept was further developed in PCT application No PCT/CA2010/001407 "LIGHT EMITTING DIODE ILLUMINATED DISPLAY" filed Sep. 8, 2010. In order to eliminate gaps between LC modulators the LEDs near the edges of each modulator may be tilted or splayed out to project light onto the screen located a short distance in front of the LC modulators such that all areas of the screen are illuminated. This approach is shown to form a practical and thin display since only a short distance is required between the screen and the LC modulators.

The use of arrays of LEDs behind each LC modulator reduces the number of LC modulators required and decreases system complexity and cost. One problem with this approach occurs because rear projection screens are sensitive to the direction from which light strikes the screen. The screen image, as viewed by the viewer, will not maintain appropriate brightness levels as the viewer views the screen from a range of viewing angles. This causes image artifacts that the viewer notices at boundaries between adjacent LC light modulators. Other problems with this approach are high power consumption due to light loss in the light modulators and screen, a lack of screen contrast due to both ambient light reflecting off the screen, contrast limitations of the light modulators and the degradation of light modulators due to the high brightness LED arrays behind the LC light modulators.

It would therefore be advantageous to enable the use of multiple LC light modulators, each containing arrays of LEDs, to project an image onto a screen without visible image artifacts and without visible gaps between LC light modulators. Furthermore it would be an advantage to achieve a reduction in power consumption, an increase in screen contrast and a decrease in the degradation of the light modulators.

SUMMARY

In a first aspect, there is provided a display illumination module comprising: a first array of light sources forming a backlight array, an optical modulating array layer positioned adjacent to and in front of the backlight array for modulating the transmission of light emitted from the backlight array, a second array of light sources comprising a flood light array positioned adjacent to and in front of the optical modulating array layer; wherein the optical modulating array layer is positioned relative to the array of backlight sources so that light emitted from a given backlight source does not or does not substantially overlap with light emitted from another backlight source within the optical modulating array layer and a rear projection screen positioned in front of the flood light array of one or more than one display illumination module such that it is illuminated by light from both the backlight array and the flood light array in each said display illumination module.

The display illumination module may further comprise an optically opaque layer provided between the array of backlight sources and the optical modulating array layer for preventing overlap of light from adjacent backlight sources within the optical modulation layer, the optically opaque layer having defined therein an array of apertures allowing the propagation of light from each the backlight source to the optical modulation layer within the defined angular range. The said rear projection screen is placed a specified distance in front of the display illumination module or modules such that an image may be rendered on said screen by the display illumination module or module. The screen may consist of a variety of known rear projection screen types. A polarizer may be bonded to the front or rear surface of the viewing surface of the screen to improve contrast.

The backlight and flood light sources are preferably light emitting diodes (LEDs) which may comprise an integrated focusing element, and may be white or colour LEDs. The LEDs may be surface mounted or through-hole mounted onto a circuit board. Optical baffles may be included for restricting the defined angular range. The backlight and flood light LEDs may be supplied with steady electrical power from a power supply or a set of power supplies provides electrical power to the arrays of LEDs. In addition the backlight and/or the flood light LEDs may be electrically controlled such that each said LED may have a variable and controlled brightness level determined by the electric current flowing at any instant in time through said LED.

The optical modulating array layer is preferably a liquid crystal modulator, and the liquid crystal modulator is preferably a colour liquid crystal modulator. The light emitted from a given backlight source illuminates two or more pixel elements and typically hundreds of pixel elements within the optical modulating array layer. The display illumination module may further comprise a housing for securing the arrays of light sources relative to the optical modulating array layer.

A distance between the array of backlight sources and the optical modulating array layer is preferably defined such that an area of the optical modulating array layer illuminated by a given light source is at least about 5 times larger than an effective emitter area of the given light source. The flood light array is preferably situated adjacent to the optical modulating array layer and as close as possible to the said modulating array layer such that the flood light LEDs do not block light from the backlight array passing through the said modulating layer. In this manner the rear projection screen may be illuminated by a superposition of light originating from the backlight array that passes through the optical modulating array layer, and light from the flood light array.

The position and/or angular orientation of each light source within the array is preferably selected so that light emitted from a given light source and transmitted by the optical modulating array layer overlaps with light emitted by an adjacent light source beyond a defined spatial offset relative to the optical modulating array layer on the screen.

In another aspect, there is provided a display system comprising: one or more display modules as described above; and a rear-projection screen positioned to be illuminated by light from the one or more display illumination modules. A distance between the array of light sources and the optical modulating array layer of each the display illumination modules is preferably chosen to prevent substantial blurring of an image projected onto the rear-projection screen. The flood light array in each said display illumination module is preferably chosen to be capable of providing uniform or substantially uniform illumination of the rear-projection screen if all of the said flood light array LEDs are turned on.

The position and/or angular orientation of each backlight source within each of the one or more display illumination modules is preferably selected so that light emitted from a given backlight source and transmitted by the optical modulating array layer overlaps with light emitted by an adjacent backlight source at the rear projection screen. The position and/or angular orientation of each flood light source within each of the one or more display illumination modules is preferably selected so that light emitted from a given flood light source overlaps with light emitted by an adjacent floodlight source at the rear projection screen. The position of each display illumination module is preferably selected so that light emitted from a given light source at an edge of a given display illumination module overlaps with light emitted by an adjacent light source in an adjacent display illumination module at the rear projection screen.

In an embodiment disclosed herein there is provided a method of display illumination, comprising:

arranging a first array of light sources, wherein each light source of said first array of light sources is configured to emit light within a defined angular range;

positioning an optical modulating array layer adjacent to said first array of light sources for modulating a transmission of light emitted from said first light sources, wherein said optical modulating array layer is positioned relative to said first array of light sources so that light emitted from a given light source in said first array of light sources does not substantially overlap with light emitted from another light source from said first array of light sources within said optical modulating array layer; and positioning a second array of light sources on an opposite side of said optical modulating array layer relative to said first array of light sources, said second array of light sources being positioned to emit light in a same general direction as the modulated light from said first array of light sources.

A further understanding of the functional and advantageous aspects of the invention can be realized by reference to the following detailed description and drawings.

BRIEF DESCRIPTION OF THE DRAWINGS

Embodiments will now be described, by way of example only, with reference to the drawings, in which.

DETAILED DESCRIPTION

Generally speaking, described herein are display systems with LED backlighting and LED flood lighting. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

In a first embodiment, a display illumination module is provided that includes an array of light sources that emit light over a selected angular range and are arranged to backlight an optical modulating array layer without mutual overlap. The transmission of light from each light source is modulated by the optical modulating array layer and may be employed to illuminate a rear projection viewing screen. In addition a second LED array or flood light array which is located in front of the optical modulating array layer also illuminates the rear projection screen. The separation distance between the optical modulation array layer and the flood light array is preferably as small as possible.

The rear-projection viewing screen is placed at a location where spatial overlap exists between light at the screen emitted from adjacent light sources from the backlight array. In addition the rear-projection viewing screen is simultaneously placed at a location where spatial overlap exists between light at the screen emitted from adjacent light sources from the flood light array. As disclosed below, in a preferred embodiment, multiple display illumination modules may be arranged to illuminate a rear-projection screen in order to provide a composite display without the appearance of visible gaps between the portions of the rear-projection screen illuminated by the display illumination modules.

For the purposes of illustration only, the embodiments below disclose the array of light sources as comprising an array of light emitting diodes. However, it is to be understood that the light sources may be any light sources that approximate point sources and provide light over a defined angular range. For example, alternative non-limiting examples of light sources include lasers with divergent beam patterns and illuminated optical fibers. The structure and operation of a display module according to one embodiment will now be described with reference to FIG. 1.

Figure 1:
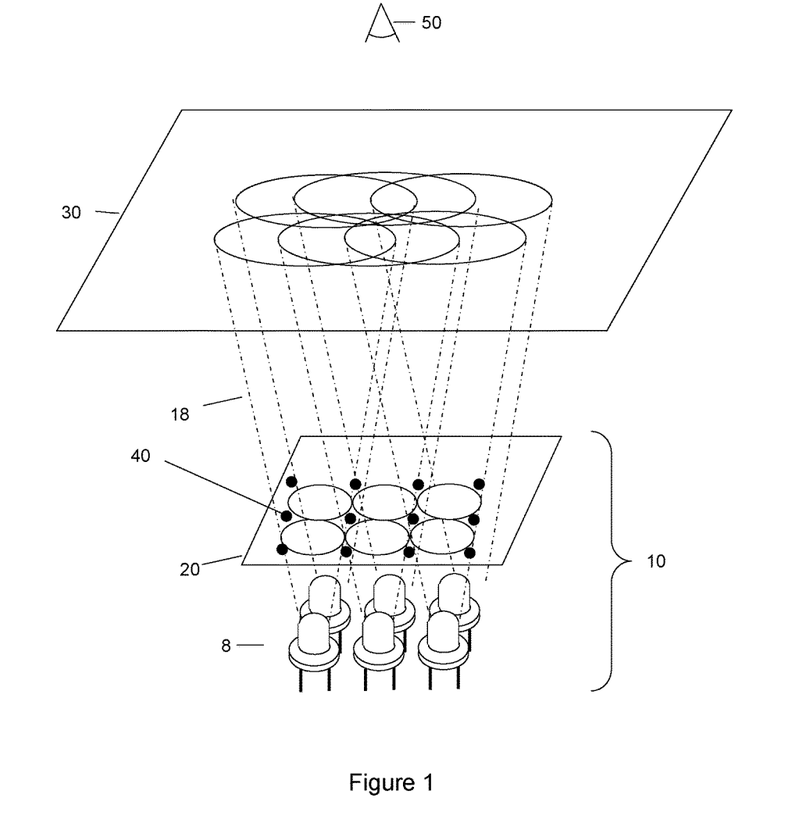
FIG. 1 is a schematic diagram of a display produced in accordance with the present invention.

Each display module 10 comprises a backlight array of white emitting LED light sources 8 which directly illuminate liquid crystal modulator 20. Light from each LED illuminates a unique and separate portion of the colour LC modulator 20 and the light then proceeds to illuminate a portion of screen 30. LC modulator 20 comprises an electrically addressable array of pixels and associated colour filters and is capable of transmitting spatially dependent, variable amounts of light of a set of substantially primary colours filtered from white light sources 8, from substantially no light to a significant amount of light according to control voltages applied to pixels of the LC modulator 20.

In addition, flood light LEDs are shown at 40. Each flood light 40 is situated at a position just in front of LC modulator 20 that does not block light from the backlight array. Each flood light 40 is preferably a set of three primary colour LEDs or one tricolour LED which has separate red, green and blue light emitters that may be individually controlled by an electronic control means in order to produce a desired illumination on screen 30, although each floodlight 40 could also be a single LED of a single colour such as white.

The flood array of LEDs 40 are wide divergence LEDs that have a wide beam spread. Preferably at each location shown at 40 in FIG. 1 there is a red, a green and a blue LED that individually have wide beam spreads. Such LEDs 40 will illuminate areas of the screen 30 that will generously overlap at the screen 30 with light from adjacent flood LEDs 40. This allows the screen 30 to be substantially uniformly lit by the array of flood array LEDs 40. Since the light from these LEDs 40 does not pass through the LC light modulator 20 their light is not attenuated by the LC light modulator 20 and substantial screen illumination is achievable even with relatively low power flood array LEDs 40 compared to the backlight LEDs 8 that are attenuated by the LC light modulator 20.

By controlling the electric current through each flood array LED 40 individually, the intensity of light from each flood array LED 40 can be set to a level appropriate for the portion of the screen 30 showing a corresponding portion of the desired image on the screen 30 affected by the light from the flood light LED 40. For example if the portion of the screen 30 is to be bright white then the relevant red, green and blue flood LEDs 40 would be substantially turned on. If the said portion of the screen is to contain detailed image content then the relevant flood LEDs 40 of each colour would be turned on only enough to provide illumination on the screen 30 relevant to the lowest intensity at the screen 30 in the portion of the image for each of the red, green and blue colour components. If the portion of the screen 30 is to show a black portion of an image then the relevant flood LEDs 40 of each colour would be turned off. If the portion of the screen 30 is to show a substantially green portion of an image then the relevant blue and red flood LEDs 40 would be substantially turned off and the relevant green flood LED 40 would be turned on. Any detailed image content in the portion of the screen is then provided by superimposing screen illumination from the backlight array LEDs 8 that is controlled by the optical modulator array layer 20 onto screen illumination provided by the flood array LEDs 40. The superposition of light from both backlight array LEDs 8 and flood light array LEDs 40 forms the final image on screen 30 and is viewed as shown by viewer 50. Preferably as much as possible of the required light to form the desired screen image will be provided by the flood array LEDs 40 since this will reduce power consumption because these flood light array LEDs 40 may be lower power LEDs relative to the backlight array LEDs 40. The display illumination module 10 includes at least one electrical driver for providing electrical power to the light emitting diodes. In an embodiment, each light emitting diode has a dedicated driver. A computer controller is included and is programmed to control the electrical power applied to the light emitting diodes in the first and second array of light sources.

Figure 2:
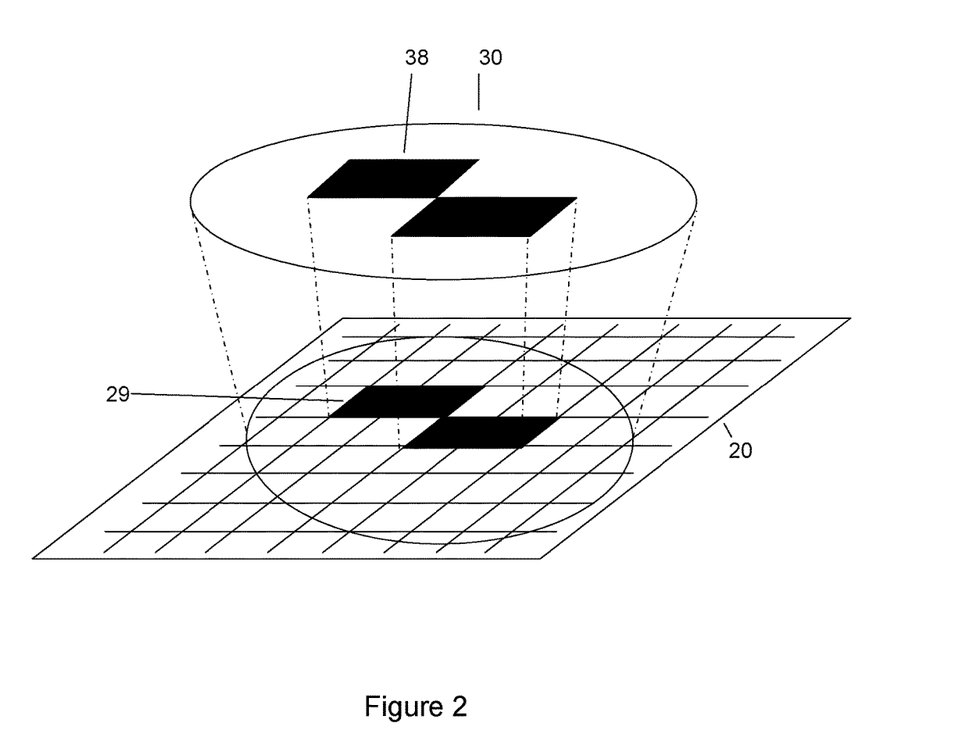
FIG. 2 shows details of the portion of the liquid crystal (LC) modulator and screen associated with one light emitting diode (LED) backlight array.

FIG. 2 shows a detail view of a liquid crystal (LC) light modulator array layer 20 and the screen 30. An example of a pattern is shown in which four LC modulator elements 29 of light modulator array layer 20 are programmed to partially block light emitted by one selected backlight array LED 8, giving rise to a light pattern 38 on screen 30. Modulator elements 29 cast a shadow on screen 30 since they block LED light from the selected backlight array LED 8, and the remaining modulator elements are programmed to pass light. In order to cast a clear shadow on screen 30, each LED 8 of the backlight array should ideally be a point source or in practice a small enough source to be an approximation of a point source. If the LC light modulator array 20 is a colour LC modulator containing arrays of colour filters and the LED is white then a set of primary colors is available to form full color light patterns or images on the screen 30. The ultimate resolution of the display illumination module 10 shown in FIG. 1 is determined by the degree of sharpness of this shadow (FIG. 2), which can be controlled by selecting the LED 8 emitter size and the spatial offset between the LED array 8 and the LC modulator array layer 20. Moreover, it is important to recognize that an appropriate resolution of the LC modulator array layers 20 will be determined by these parameters, and that increasing the resolution of the LC modulator 20 beyond a certain threshold value will not improve the final resolution of the display due to the shadow blurring effect.

Figure 3:
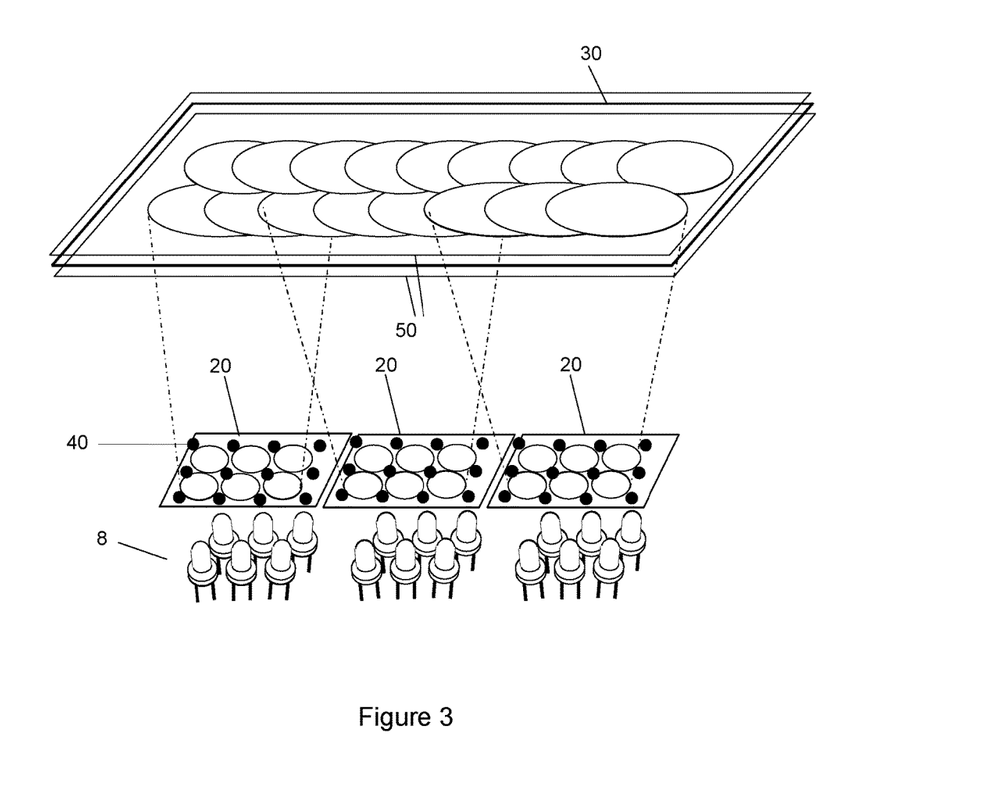
FIG. 3 is a schematic diagram of a set of three modules arranged behind one continuous screen in a display produced in accordance with the present invention.

FIG. 3 shows a group of three LC light modulator array layers 20 with corresponding backlight LEDs 8 and floodlight LEDs 40 arranged behind a rear-projection screen 30. The light reaching the screen 30 from the backlight LEDs 8 behind each two adjacent LC light modulator array layers 20 overlaps on the screen 30 to allow the image on the screen 30 to be continuous across the join between two adjacent light modulators 20. In addition the light reaching the screen 30 from the flood light LEDs 40 situated just in front of each two adjacent LC light modulator array layers 20 overlaps on the screen 30 to allow the image on the screen 30 to be continuous across the join between two light modulator array layers 20.

A polarizer 50 may optionally be optically bonded to the back or the front or both the back and the front of the viewing screen 30 to substantially reduce ambient light reflections from the screen 30 while allowing light from the display illumination module or modules 10 to pass through the said polarizer or polarizers 50. The polarizer or polarizers 50 are effective since light that passes from the LC modulator 20 is generally polarized, and provided the polarizer or polarizers pair 50 is placed such that its polarizing axis is parallel to the polarization axis of light emitted by the display illumination module or modules 10, an efficient transmission of light through polarizer or polarizer pair 50 is achievable.

As shown in FIG. 1, the backlight LEDs 8 may have an integrated lens to produce a desired radiation pattern. Such backlight LEDs 8 emit light within a cone 18 having a defined divergence angle, and the divergence angle can be selected to provide the desired angular range as described above. LEDs 8 may be incorporated with an external focusing element and/or external aperture to produce the desired angular emission profile to illuminate the LC modulator array layer 20 without overlap between adjacent LEDs. The flood light array LEDs 40 also emit light in a cone with a defined divergence angle which is preferably larger than the divergence angle of the backlight LEDs 8 to ensure that the illumination at the screen of each floodlight LED 40 overlaps with neighbouring flood light LEDs 40 illumination to produce a substantially uniform screen illumination at screen 30. Thus, the uniformity of illumination at the screen 30 by the second array of light sources 40 is achieved by the wide beam divergence angles as well as the positions and mounting angles of the individual light sources of the second array of light sources 40. The controlling means applied to the second array of light sources 40 is to enable them to provide screen illumination appropriate to specific images to be displayed, and the control means is typically a computer processor programmed with instructions to control the controllers which control the electrical power applied to the light emitting diodes in both the first and second light source arrays.

In applications that require high dynamic range and optimal contrast and minimum electrical power consumption, it is desirable to individually control the current/power supplied to each backlight LED 8 as well as to each flood light LED 40 in addition to modulating the transmission from each backlight LED 8 via the LC modulator array layer 20. Such an approach provides a display with minimum power consumption by only providing power to each LED 8 and 40 on an as-needed basis.

As noted above, a full colour image may be produced on screen 30 by the superposition of light from flood light LEDs 40 and light from backlight LEDs 8. Specifically white backlight LEDs 8 and a colour LC light modulator array layer 20 may be used. Alternatively, by employing a sufficient number of red, green and blue backlight LEDs 8 whose light is controlled by a monochrome LC light modulator array layer 20 it is also possible to produce a full colour image. In this case, all the backlight LED 8 light cones of a given colour overlap on screen 30 to provide the capability of achieving a homogeneous illumination of screen 30. Each portion of screen 30 may therefore be illuminated by light from all three colours, and any desired full color picture may be created on the screen. For example, if the backlight LEDs are turned on and a dark region on the screen is desired, the light from all the backlight LEDs 8 illuminating that region of the screen must be blocked by the appropriate portions of the LC light modulator array layer 20, and the flood LEDs 40 relevant to the proposed dark region on the screen region must be substantially turned off.

Alternatively, if a pure green region on screen 30 is desired, only the light from the blue and red backlight LEDs illuminating that region must be blocked by the appropriate portions of the LC light modulator array layer 20 and only the relevant green flood light LEDs should be substantially turned on. If a yellow region on the screen 30 is desired, only the light from all the blue backlight LEDs illuminating the region must be substantially blocked by the appropriate portions of the LC light modulator array layer 20 and the relevant blue flood light LEDs 40 should be substantially turned off. Finally, if a white region on the screen 30 is desired then all three colours of light from backlight LEDs 8 and flood light LEDs 40 could be used to form the image on the said region of screen 30.

The present display system is advantageous in that it enables a full color display with outstanding colour saturation, long life (about 100,000 hours), high efficiency (approximately ten (10) lumens/watt), high brightness (1000 cd/m2) and a wide range of display sizes including, for example, displays of three (3) meters in length or more. It is to be understood that a wide variety of rear-projection screens may be employed, including, but not limited to, those that employ refractive or scattering behaviour or a combination thereof.

Optional polarizer 50 may be a linear polarizer. Polarizer 50 may be assembled from one or more polarizer sheets that are optically bonded to a substantially transparent or semi-transparent glass or plastic support layer. If more than one polarizer sheet is required to cover the viewing surface of the screen 30, the sheets are preferably arranged to minimize any gaps between the sheets. This can render the joints between polarizer sheets invisible or substantially invisible to the display viewer.

In order to further optimize the display system, each display illumination module 10 comprises an array of light sources such that the light sources at or near the outside edges of the display illumination module 10 may be brighter than the light sources further away from the edges of the light emitting module 10. The benefit of this is that the illumination of the screen 30 may otherwise be lower at or near the screen regions behind which the outside edges of the illumination LC modulator array layers 20 are situated. The LED arrays 8 and 40 and the LC modulator array layer 20 that form the display illumination module are preferably provided in a housing that supports the LC modulator array layer 20 above the backlight LED array 8 and below the flood light LED array 8 and provides external electrical connections for driving the LED arrays and the LC modulator array layer 20 pixel elements. The backlight LEDs 8 are preferably directly mounted on a printed circuit board or boards and are optionally further positioned and/or secured through an opaque mounting layer with apertures as described above.

Figure 4:
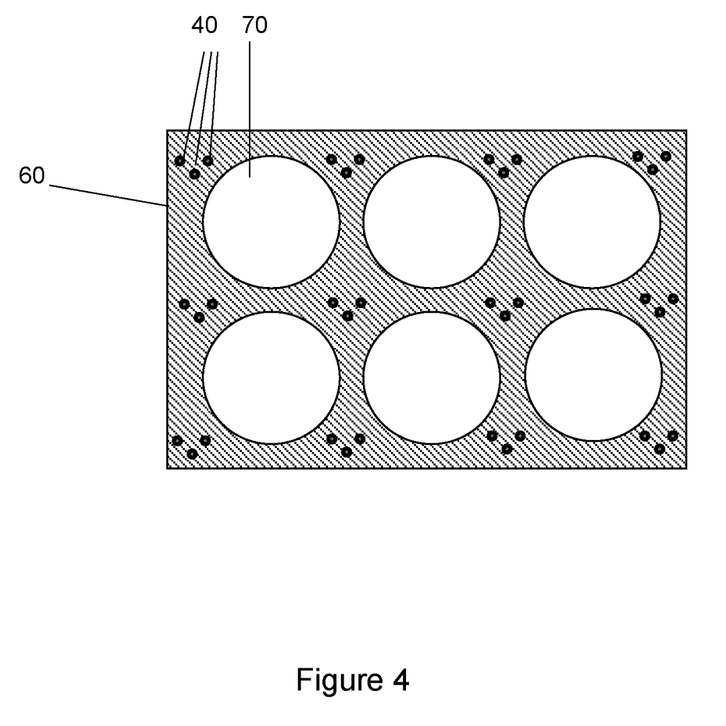
FIG. 4 is a schematic diagram of a flood light array on a printed circuit board providing for large openings.

An example of a circuit board and the flood LED assembly on said circuit board is shown in FIG. 4. As shown in FIG. 4, the red, green and blue flood light LEDs 40 comprise surface mounted LEDs mounted on a printed circuit board 60 that is provided with large openings 70 to allow the light from each backlight LED 8 to pass through the opening. The openings 70 can be large circular holes as shown in FIG. 4. The printed circuit board 60 may then be placed directly onto LC light modulator array layer 20. The display system may further comprise a display driver for receiving an image or video signal to be displayed and providing the appropriate control voltages to the LC modulator and the LEDs which are controlled by the video signal.

Figure 5:
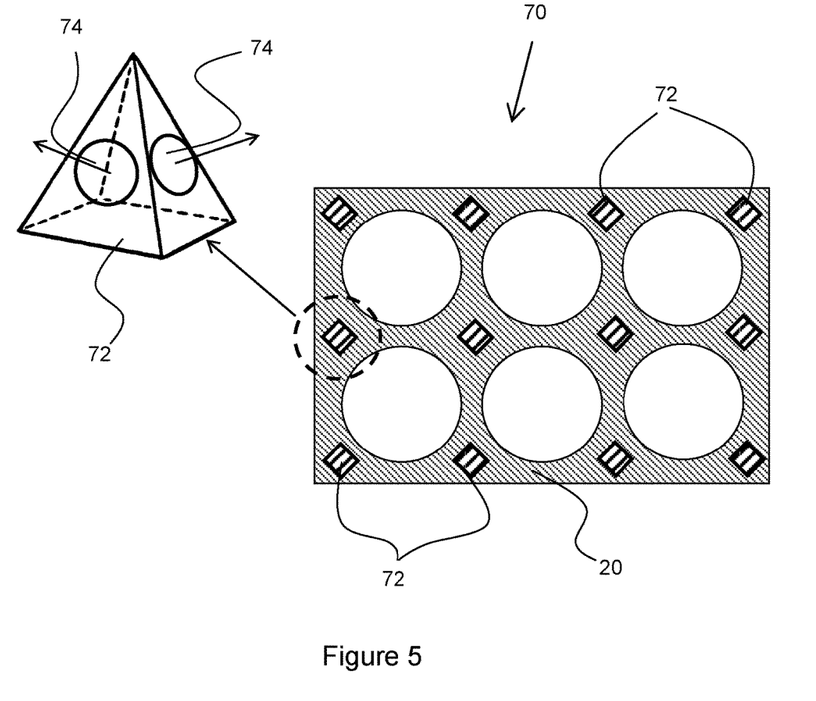
FIG. 5 is an embodiment of a flood light array showing a detail of one element of the flood light array
Figure 6:
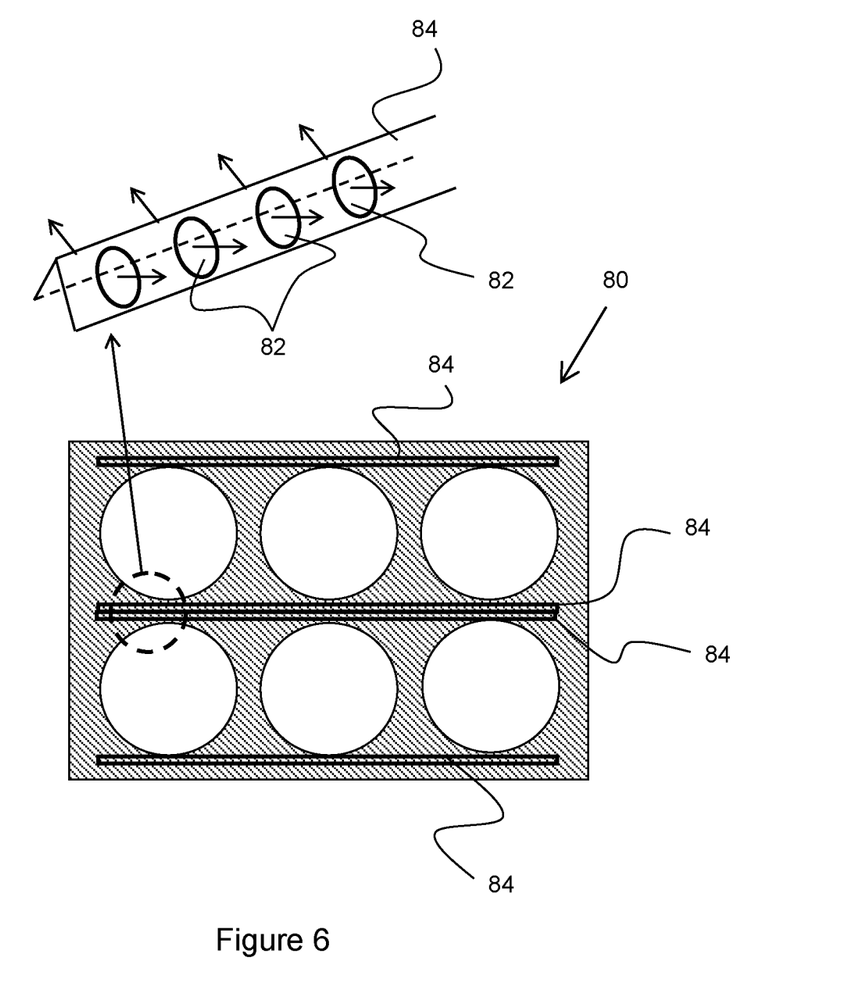
FIG. 6 is another embodiment of a flood light formed in strips showing a detail of one strip of the flood light.

Further embodiments of flood lighting are shown in FIGS. 5 and 6. In FIG. 5, an embodiment shown at 70 includes four-sided pyramids 72 which are located as shown in the spaces available between the portions of the LC light modulator array layer 20 that are being illuminated by the backlights LEDs 8. Onto each face of the pyramids 72 is attached a full colour LED 74 whose emission is thereby directed so that the light from four full colour LEDs 74 attached to the four faces of each pyramid 72 travels in four directions and thereby enhances the spread of LED light to more uniformly illuminate screen 30. Each of the full colour LEDs 74 contains a red, a green and a blue LED component. In this case each pyramid 72 therefore includes four (4) red LEDs, four (4) green LEDs and four (4) blue LEDs.

In FIG. 6 another embodiment is shown at 80 in which full rows of (may be a row of full color LEDs or a row comprising a repeating sequence of red, green and blue LEDs or a row of white LEDs) LEDs 82 are arranged in rows 84 set at angles as shown. Each row of LEDs 82 is tilted to an optimal angle so as to more uniformly illuminate the screen 30 (shown in FIG. 1).

In a preferred embodiment in which a composite display system is provided, one or more display modules and rear-projection screen 30 are mounted within an external housing.

Therefore what is claimed is:

1. A display illumination module comprising:
   a first array of light sources, wherein each light source of said first array of light sources is configured to emit light within a defined angular range;
   an optical modulating array layer positioned adjacent to said first array of light sources for modulating a transmission of light emitted from said first light sources, wherein said optical modulating array layer is positioned relative to said first array of light sources so that light emitted from a given light source in said first array of light sources does not substantially overlap with light emitted from another light source from said first array of light sources within said optical modulating array layer; and
   a second array of light sources positioned on an opposite side of said optical modulating array layer relative to said first array of light sources, and positioned to emit light in a same general direction as the modulated light from said first array of light sources.

2. The display illumination module according to claim 1 further comprising an optically opaque layer provided between said first array of light sources and said optical modulating array layer for preventing overlap of light from adjacent light sources within said optical modulating array layer, said optically opaque layer having defined therein an array of apertures allowing propagation of light from each said light source from first array of light sources to said optical modulating array layer within said defined angular range.

3. The display illumination module according to claim 1 wherein said light sources in said first array of light sources are an array of light emitting diodes.

4. The display illumination module according to claim 3 wherein said light emitting diodes emit light having a white color.

5. The display illumination module according to claim 4 wherein said optical modulating array layer is a colored liquid crystal modulator.

6. The display illumination module according to claim 3 wherein said light emitting diodes emit light having red, green and blue colors.

7. The display illumination module according to claim 6, wherein said array of light emitting diodes comprises one or more types of light emitting diodes, wherein each of said type of said light emitting diodes is configured to emit a different color, including at least one electrical driver for providing electrical power to said light emitting diodes, and including a controller programmed to control the electrical power applied to the light emitting diodes in said second array of light sources.

8. The display illumination module according to claim 6 wherein said wherein said optical modulating array layer is a monochrome liquid crystal modulator.

9. The display illumination module according to claim 6 wherein one or more of a position and an angular orientation of each light source within said first array of light sources is selected so that light emitted from a given light source of a given color and transmitted by said optical modulating array layer overlaps with light emitted by an adjacent light source of a common color beyond a defined spatial offset relative to said optical modulating array layer.

10. The display illumination module according to claim 3, wherein said light emitting diodes are surface mounted onto a circuit board.

11. The display illumination module according to claim 3 wherein said light emitting diodes each comprise an integrated focusing element.

12. The display illumination module according to claim 3 further comprising optical baffles for restricting said defined angular range.

13. The display illumination module according to claim 3 further comprising at least one electrical driver for providing electrical power to said light emitting diodes, and including a controller programmed to control the electrical power applied to the light emitting diodes.

14. The display illumination module according to claim 13, wherein said at least one electrical driver comprises one electrical driver for each light emitting diode in said array of light emitting diodes.

15. The display illumination module according to claim 1 wherein said optical modulating array layer is a liquid crystal modulator.

16. The display illumination module according to claim 1 wherein said light emitted from said given light source in said first array of light sources illuminates two or more pixel elements within said optical modulating array layer.

17. The display illumination module according to claim 1 wherein a distance between said first array of light sources and said optical modulating array layer is defined such that an area of said optical modulating array layer illuminated by a given light source is at least about 5 times larger than an effective emitter area of said given light source.

18. The display illumination module according to claim 1 wherein said second array of light sources is mounted on said optical modulating array layer and mounted in such a way as to not substantially block light being transmitted from the first array of light sources through said optical modulating array layer, and including a support means for supporting said optical modulating array layer relative to said first array of light sources.

19. The display illumination module according to claim 1, further comprising a support means for supporting said optical modulating array layer relative to said first array of light sources and said second array of light sources.

20. The display illumination module according to claim 1 wherein said light sources in said second array of light sources are an array of light emitting diodes.

* * * * *